US012732881B2

(12) United States Patent
Sevilla R. et al.

(10) Patent No.: US 12,732,881 B2
(45) Date of Patent: Sep. 8, 2026

(54) NEXT GENERATION MOBILE NETWORK LATENCY TRIGGERED MOBILITY

(71) Applicant: Verizon Patent and Licensing Inc., Basking Ridge, NJ (US)

(72) Inventors: Francisco X Sevilla R., Eden Prairie, MN (US); David Taft, Keller, TX (US); Lap Tse, Marietta, GA (US); Sudhakar Reddy Patil, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 331 days.

(21) Appl. No.: 18/433,884

(22) Filed: Feb. 6, 2024

(65) Prior Publication Data

US 2025/0254589 A1 Aug. 7, 2025

(51) Int. Cl.
*H04W 36/30* (2009.01)
*H04W 36/00* (2009.01)

(52) U.S. Cl.
CPC ....... *H04W 36/30* (2013.01); *H04W 36/0094* (2013.01)

(58) Field of Classification Search
CPC ........... H04L 5/14; H04L 12/841; H04L 5/00; H04W 36/30; H04W 36/0094; H04W 88/04; H04W 72/04; H04W 64/00; H04W 24/10
See application file for complete search history.

(56) References Cited

U.S. PATENT DOCUMENTS

2014/0079022 A1* 3/2014 Wang .................... H04W 76/15 370/331
2015/0141018 A1* 5/2015 Kapoulas ........... H04W 36/324 455/437
2015/0358959 A1* 12/2015 Meshkati ............. H04W 28/16 370/329
2016/0057585 A1* 2/2016 Horn ..................... H04L 45/245 370/312
2019/0208438 A1* 7/2019 Yang ....................... H04L 43/16
2020/0195521 A1* 6/2020 Bogineni .............. H04W 36/26
2020/0228271 A1* 7/2020 Manolakos ............... G01S 5/14
2022/0070808 A1* 3/2022 Jacobsen ........... H04W 56/0035
2023/0189111 A1* 6/2023 Bulakci ................. H04W 36/30 370/331
2023/0362807 A1* 11/2023 Kodaypak ......... H04W 52/0203
2024/0349144 A1* 10/2024 Damnjanovic ... H04W 36/0058

* cited by examiner

*Primary Examiner* — Bailor C Hsu

(57) ABSTRACT

A base station determines a latency requirement of a user equipment device (UE), and receives latency measurements associated with multiple neighboring cells or cell sectors having coverage areas within a certain proximity to the base station. The base station measures a latency associated with a first cell or cell sector, having a coverage area generated by the base station, that is currently serving the UE. The base station triggers a mobility event for the UE, based on the UE's latency requirement, the measured latency of the first cell or cell sector, and the latency measurements associated with the multiple neighboring cells or cell sectors, to a selected one of the multiple neighboring cells or cell sectors.

20 Claims, 7 Drawing Sheets

100
110
125
AMF
140
PCF
145
UDM
130
SMF
153
150
Next Gen RAN
gNB
143
NSSF
135
UPF 105
UE
Next Generation Mobile Network (SA)
115
Next Gen RAN (NSA)
Packet Data Network
155
185
PCRF
160
LTE RAN
eNB
SGW
170
PGW
165
MME
HSS
120
163
4G Mobile Network
175
180

NEXT GENERATION MOBILE NETWORK LATENCY TRIGGERED MOBILITY

BACKGROUND

Next Generation mobile networks, such as Fifth Generation New Radio (5G NR) mobile networks, may operate in various frequency ranges, including higher frequency ranges (e.g., in the gigahertz (GHz) frequency band), and may have a broad bandwidth (e.g., near 500-1,000 megahertz (MHz)). The bandwidth of Next Generation mobile networks supports higher speed downloads and uploads. The 5G mobile telecommunications standard supports more reliable, massive machine communications (e.g., machine-to-machine (M2M), Internet of Things (IoT)). Next Generation mobile networks, such as those implementing the 5G mobile telecommunications standard, are expected to enable a higher utilization capacity than current wireless networks, permitting a greater density of wireless users. Next Generation mobile networks are designed to increase data transfer rates, increase spectral efficiency, improve coverage, improve capacity, and reduce latency.

DETAILED DESCRIPTION

Figure 1:
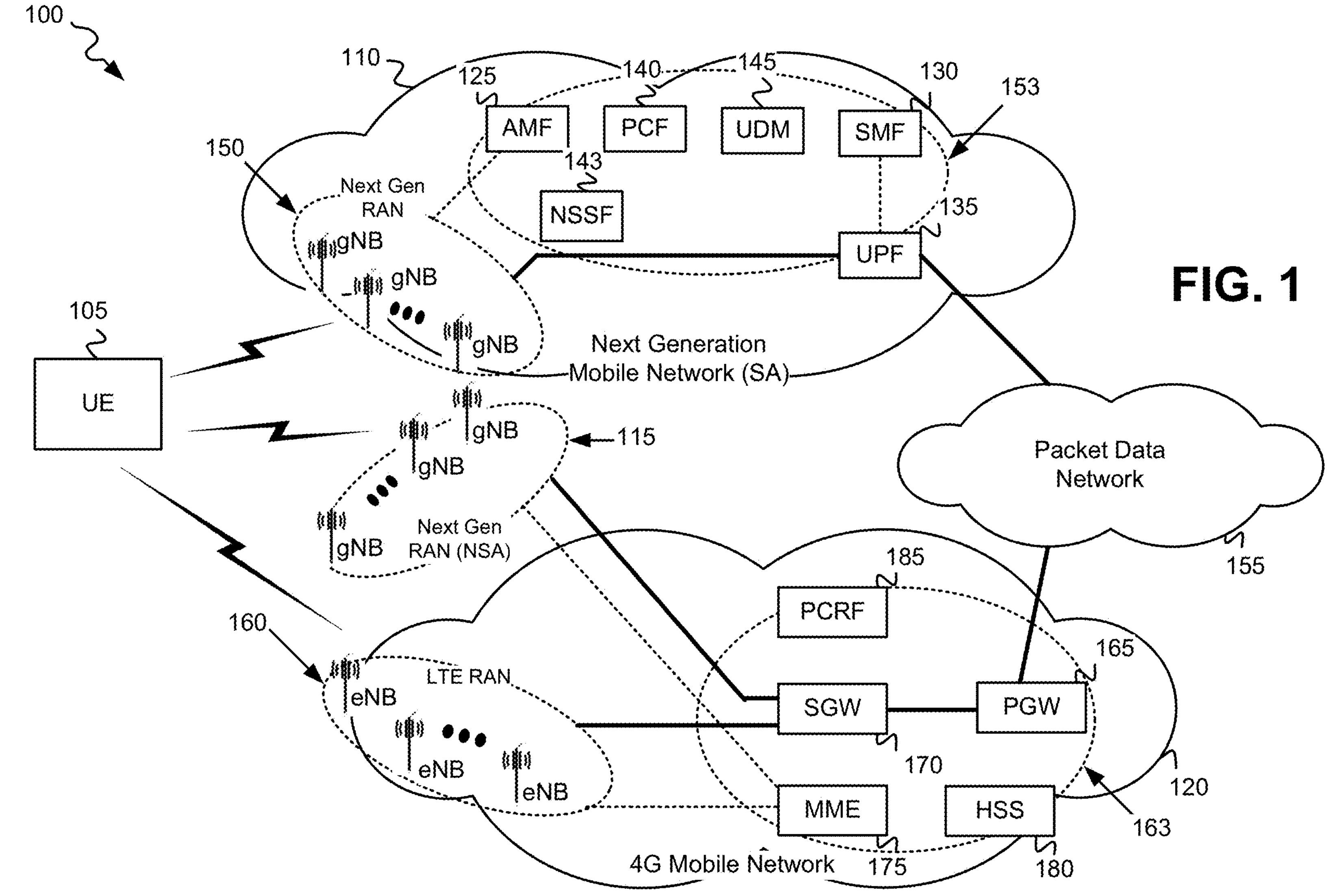
FIG. 1 depicts an example of a network environment in which latency triggered mobility of user equipment devices (UEs) is implemented.

The following detailed description refers to the accompanying drawings. The same reference numbers in different drawings may identify the same or similar elements. The following detailed description does not limit the invention.

"Network Slicing" is an innovation for implementation in Next Generation Mobile Networks, such as, for example, Fifth Generation (5G) Mobile Networks, and represents a key benefit of Next Generation wireless network architectures. Network slicing is a type of virtualized networking architecture that involves partitioning of a single physical network into multiple virtual networks that may be composed of various Virtual Network Functions (VNFs). VNFs include network functions that have been moved out of dedicated hardware devices into software that runs on commodity hardware. VNFs may be executed as one or more Virtual Machines (VMs) on top of the hardware networking infrastructure. The partitions or "slices" of a virtualized network, including each slice's VNFs, may be customized to meet the specific needs of applications, services, devices, customers, or operators. Each network slice can have its own architecture, provisioning management, and security that supports data sessions transported over the network slice. Bandwidth, capacity, and connectivity functions are allocated within each network slice to meet the requirements of the objective of the particular network slice. For example, each network slice, when created in a mobile network, may be designed to satisfy one or more performance characteristics or performance requirements for data sessions that are serviced by the network slice. Network slicing may be implemented in a dynamic fashion, such that the slices of the virtualized network may change over time and may be re-customized to meet new or changing needs of applications, services, devices, customers, or operators.

Network slicing in a mobile network may have many components: core network slicing and Radio Access Network (RAN) slicing are two examples. Core network slicing involves the creation and allocation of core VNFs to multiple virtual networks, where each virtual network serves traffic routed over a different network slice. The core VNFs typically include the core mobile network functions that implement the essential functions which enable the mobile network to provide wireless mobile service to user equipment devices (UEs). Such core VNFs in a 5G mobile network may include, for example, User Plane Functions (UPFs), Session Management Functions (SMFs), Access and Mobility Management Functions (AMFs), Unified Data Management (UDMs) functions, and Policy Control Functions (PCFs). The core VNFs may include other network functions, including switches, routers, servers, tunneling gateway elements, traffic analysis functions, and security functions (e.g., firewalls, intrusion detection systems, virus scanners, and spam protection).

RAN slicing divides physical layer resources at a mobile network base station (referred to as the Next Generation NodeB (gNB) in 5G networks) among multiple network slices and among UE traffic not assigned to a particular network slice. In Next Generation networks, the physical layer radio resources are typically divided into resource blocks (RBs), where each RB includes at least one frequency sub-band and at least one time slot. In 5G networks, for example, the gNB may use Orthogonal Frequency Division Multiple Access (OFDMA), the frequency bandwidth may be divided into sub-carrier frequencies that are orthogonal, and time may be divided into slots called Transmission Time Intervals (TTIs). The RAN RBs at a gNB may, therefore, be conceptually organized into a two-dimensional grid with sub-carrier frequencies on the y-axis of the grid, and TTIs on the x-axis of the grid. An RB in 5G is usually the smallest resource unit that can be allocated to a UE or to a network slice and, for example, may be formed from twelve sub-carrier frequencies and one TTI slot. In the RAN slicing of 5G networks, one or more particular RBs are allocated to each network slice for use by that network slice. Therefore, each network slice in 5G networks may be allocated a set of physical RBs, where each physical RB encompasses at least one particular sub-carrier frequency and at least one particular TTI slot. A network function at each gNB, sometimes called a RAN scheduler, dynamically allocates RBs to the network slices, and to other UE traffic not assigned to a network slice.

Network slices are configured to provide different levels of performance for particular network performance characteristics, such as, for example, latency, bandwidth, error rate, jitter, and throughput. Some network slices are configured to provide low latency service to subscribers. However, in 5G stand-alone mobile networks, low latency subscribers may experience "lag" delays during mobility events because such events are based on radio frequency (RF) thresholds (e.g., signal quality thresholds) and do not take into account latency requirements of the network slice. In example embodiments described herein, Next Generation mobile network base stations monitor RAN latency associated with a cell/cell sector/sub-sector currently serving a subscriber, RAN latencies associated with neighboring cells/cell sectors/sub-sectors, and RAN latencies associated with Long Term Evolution (LTE) fallback cells/cell sectors that have overlapping RF coverage of the serving cell/cell sector/sub-sector. A mobility event, such as a cell hand-off, may then be triggered by a base station based on the monitored RAN latencies. The monitored RAN latency of the currently serving cell of the base station may be compared with a RAN latency threshold that is derived from a latency requirement of the subscriber/UE. The latency requirement may be associated with the network slice that is currently handling the subscriber/UE's session traffic, or may be obtained from a subscriber profile. If the monitored RAN latency of the currently serving cell exceeds the RAN latency threshold, then the monitored RAN latencies of the neighboring cells/cell sectors and/or the RAN latencies associated with LTE fallback cells/cell sectors may be compared to the subscriber/UE's latency requirement to identify and select a neighboring cell/cell sector or LTE fallback cell/cell sector to which mobile service for the subscriber/UE may be handed off. Any ongoing traffic sessions for the subscriber/UE may then be re-routed to the selected neighboring cell/cell sector or LTE fallback cell/cell sector. Example embodiments described herein, therefore, serve to maintain end-to-end levels of latency performance required by subscribers' network subscriptions, or required by particular network slices in the mobile network that are carrying subscribers' traffic.

FIG. 1 depicts an example of a network environment 100 in which latency triggered mobility of UEs is implemented. As shown, the network environment 100 includes a UE 105 that may wirelessly communicate with a stand-alone (SA) Next Generation mobile network 110, a non-stand alone (NSA) Next Generation RAN 115 that connects to a Fourth Generation (4G) mobile network 120, and/or the 4G mobile network 120 directly via its own LTE RAN. In the example network environment 100 of FIG. 1, UE 105 may establish a wireless RF connection with the Next Generation RAN 150 of mobile network 110, the NSA Next Generation RAN 115, and/or an LTE RAN 160 of mobile network 120, to communicate with another UE (not shown) or with another network node or device, such as, for example, a server.

UE 105 (generically referred to herein as a "UE 105," or a "mobile device") may include any type of electronic device having a wireless communication capability. UE 105 may include, for example, a laptop, palmtop, desktop, or tablet computer; a cellular phone (e.g., a "smart" phone); a Voice over Internet Protocol (VOIP) phone; a smart television (TV); an audio speaker (e.g., a "smart" speaker); a video gaming device; a music player (e.g., a digital audio player); a digital camera; a device in a vehicle; a wireless telematics device; an Extended Reality (XR) device (e.g., an Augmented Reality (AR) or Virtual Reality (VR) headset or glasses); or an Internet of Things (IoT) or Machine-to-Machine (M2M) device. A user (not shown) may carry, use, administer, and/or operate UE 105. Each user may also be referred to herein as a "mobile subscriber" or a "subscriber." Though only a single UE 105 is depicted in FIG. 1, network environment 100 may include multiple UEs 105 communicating via RAN networks 150, 115, and/or 160.

UE 105 may have installed, and may execute, at least one application (app) that can be used to establish data sessions with an app server (not shown in FIG. 1), or other destination node. Each app executing at UE 105 may generate data traffic that has particular characteristics and has particular network performance requirements for achieving a desired level of user experience for the user at the UE 105. For example, a particular app may require a high bandwidth, and a certain maximum level of latency, over Next Generation mobile network 110 to ensure a high-quality user experience at the UE 105. As another example, a different app executing at UE 105 may require Ultra Reliable Low Latency Communications (URLLC) over Next Generation mobile network 110. UE 105 may be installed with, and may execute, multiple different apps whose session traffic may be selectively routed via one of multiple different network slices (not shown in FIG. 1) implemented in Next Generation mobile network 110.

Next Generation mobile network 110 (referred to herein as a "mobile network 110" or a "network 110") includes any type of a Public Land Mobile Network (PLMN) that includes evolved network components (e.g., future generation components) relative to a Long-Term Evolution (LTE) network, such as a Fourth Generation (4G) or 4.5G mobile network. In one implementation, Next Generation Mobile network 110 may include a Fifth Generation (5G) mobile network. Next Generation mobile network 110 may include one or more sub-networks, such as Radio Access Network (RAN) 150 and a mobile core network 153 (referred to herein as "mobile core network 153" or "core network 153"). Next Generation mobile network 110 may include one or more nodes/functions (e.g., UPF(s) 135 described below) that interconnect with a data network 155.

As shown in the example of FIG. 1, in which Next Generation Mobile Network 110 includes a 5G Stand-Alone (SA) mobile network, the core network 153 of Next Generation mobile network 110 may include, among other nodes, functions, or components, an Access and Mobility Management Function (AMF) 125, a Session Management Function (SMF) 130, a User Plane Function (UPF) 135, a Policy Control Function (PCF) 140, a Network Slice Selection Function (NSSF) 143, and a User Data Management (UDM) function 145.

AMF 125 may include functions executed by a network device to perform UE-based authentication, authorization, and mobility management for UE 105. SMF 130 may include functions executed by a network device to perform session management and to select and control particular nodes (e.g., UPFs) for data transport, including applying policy rules received from PCF 140. UPF 135 may include functions executed by a network device to act as a router and a gateway between Next Generation Mobile network 110 and an external network, such as packet data network 155, and to forward session data between the external network (e.g., packet data network 155) and Next Generation RAN 150. Though only a single UPF 135 is shown in FIG. 1, Next Generation Mobile network 110 may include multiple UPFs 135 disposed at various geographic locations in network 110. Packet data network 155 may include any type of packet-switching network, such as, for example, the Internet.

PCF 140 may include functions executed by a network device to implement policy control for service data flows and Protocol Data Unit (PDU) session related policy control. For example, PCF 140 may store and/or generate policy rule sets that may apply to traffic from different UEs 105 and may supply one or more policy rules to an SMF 130 handling a UE session. NSSF 143 selects a set of network slice instances (NSIs) that may serve a UE 105, and determines the single Network Slice Selection Assistance Information (S-NSSAIs) for one or more network slices for use by the UE 105. UDM 145 may include functions executed by a network device to manage data for user access authorization, user registration, and data network profiles. UDM 145 may include, or operate in conjunction with, a User Data Repository (UDR-not shown) which stores user data, such as customer profile information, customer authentication information, and encryption keys.

Next Generation RAN 150 may include at least one Central Unit (CU) (not shown), one or more Distributed Units (DUs) (not shown), and one or more Radio Units (RUs) (not shown). Each CU includes a network device that operates as a digital function unit that transmits digital baseband signals to the multiple DUs, and receives digital baseband signals from the multiple DUs. If a CU is connected to the multiple DUs via, for example, optical fibers, then the CU may convert the digital baseband signals into corresponding optical signals for transmission to the DUs, and may receive optical signals from the DUs and convert the optical signals into corresponding digital baseband signals. The DUs and RUs include network devices that operate as radio function units that transmit and receive radio frequency (RF) signals to/from UEs 105. Each of the RUs may include at least one antenna array, transceiver circuitry, and other hardware and software components for enabling the RUs to receive data via wireless RF signals from UEs 105, and to transmit wireless RF signals to UEs 105. If Next Generation Mobile network 110 is a 5G New Radio (NR) network, a CU, at least one DU, and at least one RU, represent a distributed Next Generation NodeB, which may also be referred to herein as a "gNB" or a "base station." The CU, at least one DU, and at least one RU may also represent an enhanced LTE (eLTE) eNB, also referred to herein as a "base station," that can connect to Next Generation Mobile network 110.

Each CU of Next Generation RAN 150 may be split into a Control Unit-User Plane function (CU-UP) (not shown) and a Control Unit-Control Plane function (CU-CP) (not shown). A CU-UP may interconnect with one or more DUs of RAN 150 via fronthaul links or a fronthaul network, and may include a logical node that hosts user plane functions, such as, for example, data routing and transport functions. A CU-CP includes a logical node that hosts Radio Resource Control (RRC), and other control plane functions (e.g., Service Data Adaptation Protocol (SDAP), Packet Data Convergence Protocol (PDCP)) for the CU-UP. RAN 150 may additionally include other nodes, functions, and/or components not shown in FIG. 1 and not described herein.

4G mobile network 120 may include, as shown in the example network environment 100 of FIG. 1, a hybrid 4G/Next Generation mobile network where the 4G mobile network 120 may further connect with a non-stand alone (NSA) Next Generation RAN 115. NSA Next Generation RAN 115 includes components similar to those described above with respect to Next Generation RAN 150 of the SA Next Generation mobile network 110, but those components connect to 4G mobile network 120 instead of connecting to SA Next Generation mobile network 110. UE 105 may establish a wireless connection with 4G mobile network 120, via either an eNB of LTE RAN 160 and/or a gNB of NSA Next Generation RAN 115, to communicate with another UE (not shown) or with another network node, such as a server. 4G mobile network 120 may alternatively include a non-hybrid 4G network in which the network 120 includes any type of a PLMN that implements a LTE mobile telecommunications standard, such as the 4G or 4.5G LTE standard, and that does not connect to NSA Next Generation RAN 115.

4G mobile network 120 may include one or more subnetworks, such as an LTE RAN 160 and a mobile core network 163 (referred to herein as "core network 163" or "mobile core network 163"). 4G mobile network 120 may include one or more nodes/functions (e.g., a PGW(s) 165) that interconnect with data network 115. Core network 163 of 4G mobile network 120 may include, among other functions, nodes, or components, a Packet Gateway (PGW) 165, a Serving Gateway (SGW) 170, a Mobility Management Entity (MME) 175, a Home Subscriber Server (HSS) 180, a Policy and Charging Rules Function (PCRF) 185, and LTE RAN 160.

PGW 165 includes functions executed by a network device to act as a router and a gateway between 4G network 120 and the external packet data network 155, and to forward session data between the packet data network 155 and LTE RAN 160. SGW 170 includes functions executed by a network device to route and forward session data between PGW 165 and the LTE RAN 160 serving the UE session. MME 175 includes functions executed by a network device to act as a control entity for 4G Mobile Network 120, including communicating with HSS 180 for user/device authentication and for user/device profile download. MME 175 further provides UE 105 with mobility management and session management functions using, for example, Network Access Stratum (NAS) signaling. HSS 180 includes functions executed by a network device to perform user authentication, session establishment, and/or access authorization based on stored subscriber service profiles. PCRF 185 includes functions executed by a network device to deploy policy and charging rules to allocate network resources and manage charges for services and subscribers.

LTE RAN 160 may include baseband units (BBUs-not shown) and remote radio heads (RRHs-not shown). Each BBU may connect to multiple RRHs via, for example, optical fibers, and may operate as a digital function unit that transmits digital baseband signals to the multiple RRHs and receives digital baseband signals from the multiple RRHs. The RRHs include network devices that operate as radio function units that transmit and receive radio frequency (RF) signals to/from UE 105. If the RRHs are connected to a BBU via an optical fiber, the RRHs may convert received RF signals to optical signals and transmit the optical signals to the BBU. Additionally, the RRHs may receive optical signals from the BBU via the optic fiber and convert the optical signals to RF signals for transmission via one or more antennas (e.g., one or more antenna arrays) of the RRHs. Each of the RRHs may include at least one antenna array, transceiver circuitry, and other hardware and software components for enabling the RRHs to receive data via wireless RF signals from UE 105, and to transmit wireless RF signals to UE 105. In 4G mobile network 120, a BBU and a RRH represent a distributed eNB, such as is shown in FIG. 1, and may also be referred to herein as a "base station."

The configuration of network components of network environment 100 shown in FIG. 1 is for illustrative purposes. Other configurations may be implemented. Therefore, network environment 100 may include additional, fewer, and/or different components that may be configured in a different arrangement than that depicted in FIG. 1. For example, network environment 100 may include numerous UEs (e.g., UEs 105-1 through **105-*x*, where x>>2). Further, network environment 100 may include additional networks not shown in FIG. 1. Additionally, core network 153 of Next Generation mobile network 110 and core network 163 of 4G mobile network may include other NFs not shown in FIG. 1. Though only a single one of each of the NFs (e.g., AMF 125, SMF 130, UPF 135, PCF 140, NSSF 143, and UDM 145, PGW 165, SGW 170, MME 175, HSS 180, PCRF 185) is shown in FIG. 1, Next Generation mobile network 110 and/or 4G mobile network 120 may each include multiple instances of the NFs shown in FIG. 1. For example, each network slice (as described with respect to FIG. 2 below) of Next Generation mobile network 110 may include its own SMF 130, PCF 140, and UPF 135**.

Figure 2:
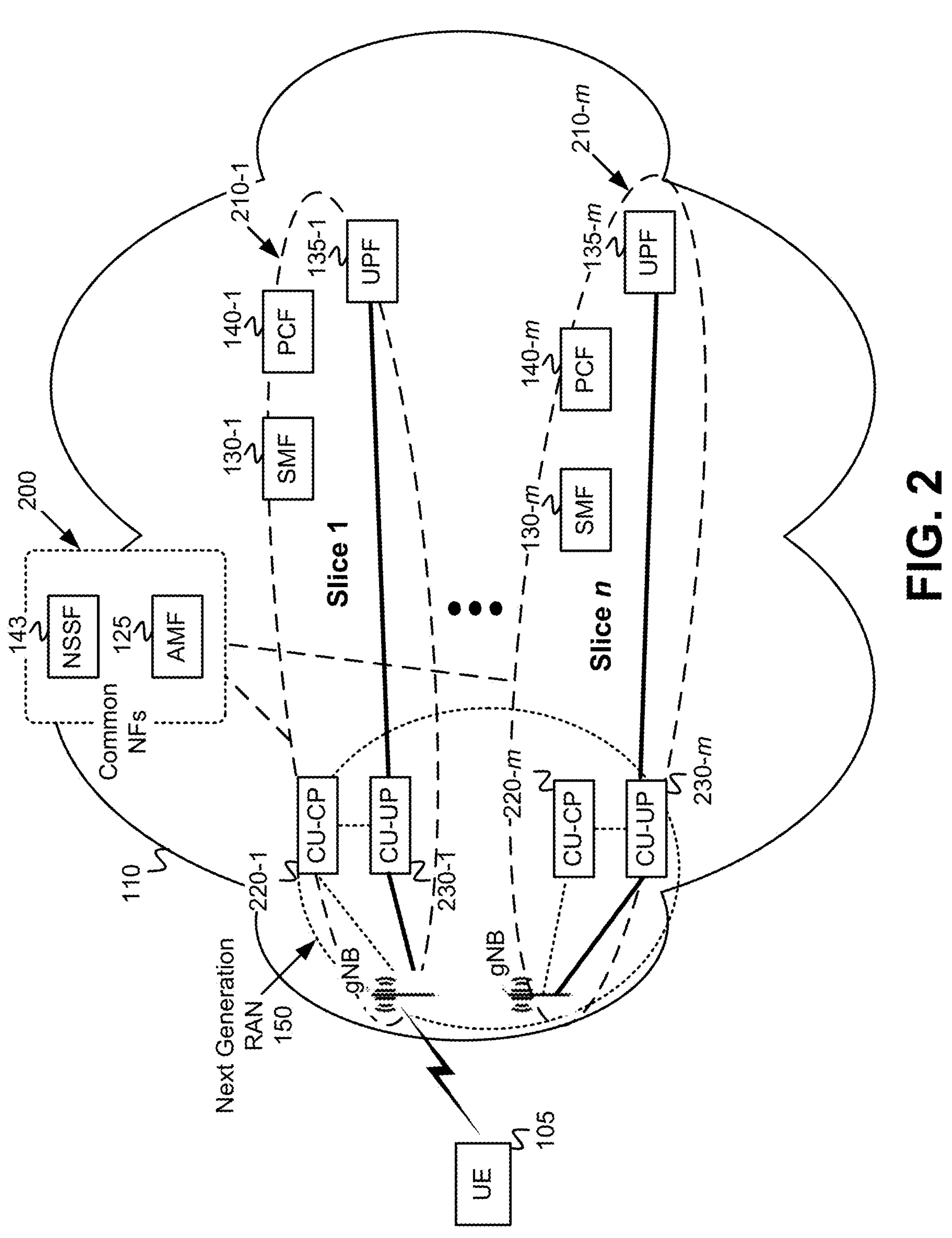
FIG. 2 depicts an example of the division of a mobile network into multiple network slices.

FIG. 2 depicts an example of the division of the Next Generation mobile network 110 into multiple (m) network slices. Each network slice of network slices 210-1 through **210-*m* may include a logical end-to-end network, which may run on a shared physical infrastructure, that is created to serve a particular purpose and/or service data traffic (e.g., of particular applications) with a particular set of performance parameters or characteristics. For example, each network slice of network slices 210-1 through 210-*m*** may service a particular service type and/or may satisfy or meet particular network performance requirements for sessions served by the network slice. In some implementations, each network slice may have a different Slice/Service Type (SST), such as, for example, an enhanced Mobile Broadband (eMBB) SST, an Ultra Reliable Low Latency Communications (URLLC) SST, or a Massive Internet of Things (mIoT) SST. Each network slice may, however, have a different SST not described herein.

As shown in FIG. 2, a group of common NFs 200 of Next Generation mobile network 110 may service the various different network slices 210-1 through **210-*m* (where m is greater than or equal to two) and, therefore, may not be considered to be included within the network slices 210-1 through 210-*m*. In the example shown, the common NFs 200 of mobile network 110 may include an AMF 125 and a NSSF 143**.

Each network slice may include its own dedicated set of NFs, where each NF operates to service UE sessions handled by that particular network slice. For example, as shown in FIG. 2, network slice 210-1 includes SMF 130-1, PCF 140-1, UPF 135-1, CU-UP 230-1, and CU-CP 220-1 that may operate to exclusively service traffic of UE sessions within network slice 210-1. As a further example, network slice **210-*m* includes SMF 130-*m*, PCF 140-*m*, UPF 135-*m*, CU-UP 230-*m*, and CU-CP 220-*m* that may operate to exclusively service traffic of UE sessions within network slice 210-*m***.

Each network slice 210 may be served by one or more Network Slice Instances (NSIs). An NSI includes a set of NF instances and the resources (e.g., compute, storage, and networking resources) required to form a deployed NSI for serving a particular network slice. Thus, each network slice 210 may include one or more NSIs, with each NSI serving the overall purpose and/or performance requirements of the network slice 210 within the constraints of the network slice 210, and each NSI may be assigned its own NSI identifier (ID). Each network slice 210 may be assigned a Single-Network Slice Selection Assistance Information (S-NSSAI) value that uniquely identifies the network slice. The S-NSSAI value may, for example, include a Slice/Service Type (SST) value and a Slice Differentiator (SD) value (e.g., S-NSSAI=SST+SD). The SST may define the expected behavior of the network slice in terms of specific features and services. The SD value may be directly related to the SST value and may be used as an additional differentiator (e.g., if multiple network slices carry the same SST value). The S-NSSAI and NSI IDs, of the different NSIs within the network slice, may be used within mobile network 110 for network slice and NSI selection for servicing UE sessions.

FIG. 2 depicts network slices 210-1 and **210-*m* as each involving a different gNB of Next Generation RAN 150. However, two or more network slices in RAN 150** may use a same gNB. In the case of two or more network slices using the physical layer resources of a same gNB, each network slice may, in some circumstances, use a different resource block at the gNB. Alternatively, in other circumstances, each network slice of multiple network slices may use a different sub-carrier frequency and/or TTI within a same resource block.

Figure 3:
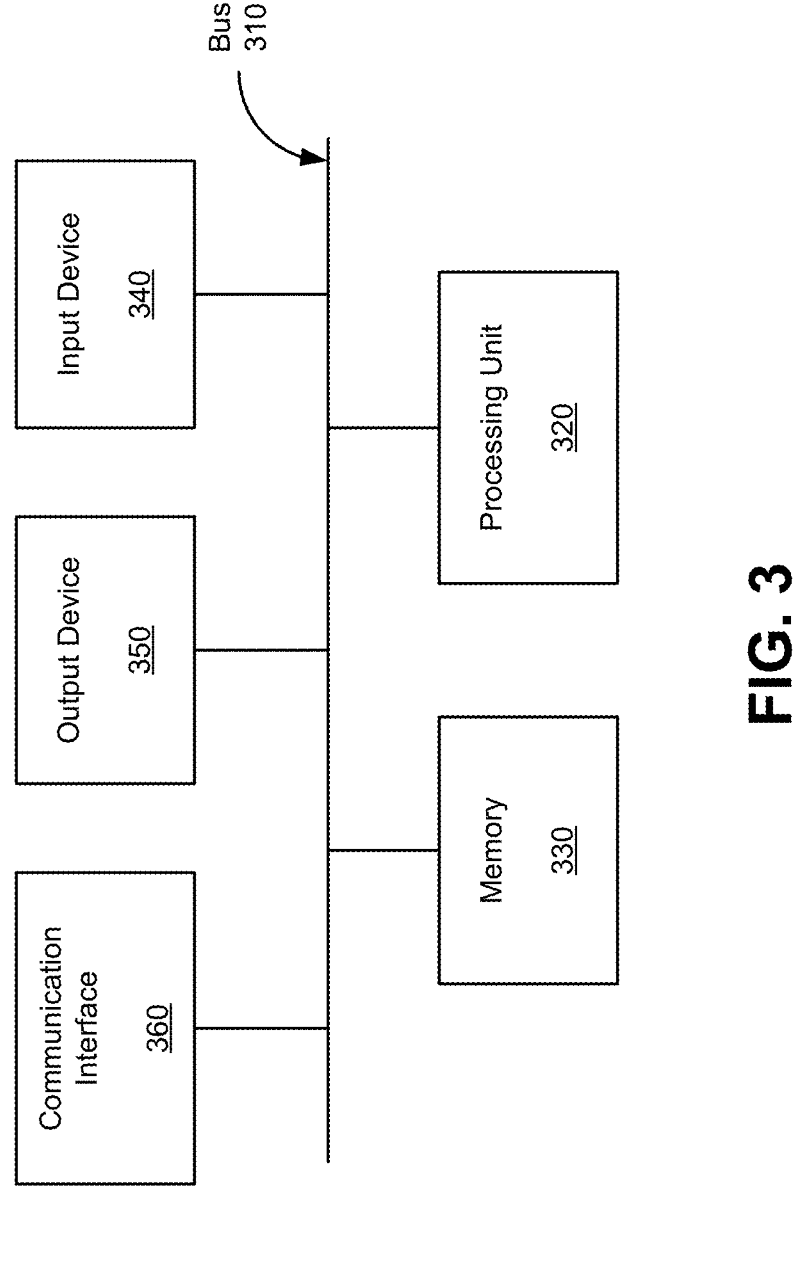
FIG. 3 is a diagram that depicts example components of a device described herein.

FIG. 3 is a diagram that depicts example components of a network device 300 (referred to herein as a "network device" or a "device"). UEs 105, and the DUs, RUs, and CUs of the gNBs and eNBs of RANs 150, 115, and 160 may include components that are the same as, or similar to, those of device 300 shown in FIG. 3. Furthermore, each of the network functions UPF 135, SMF 130, AMF 125, PCF 140, NSSF 143, and UDM 145 may be implemented by a device that includes components that are the same as, or similar to, those of network device 300. Some of the NFs UPF 135, SMF 130, AMF 125, NSSF 143, UDM 145, and PCF 140 may be implemented by a same device 300 within mobile network 110, while others of the functions may be implemented by one or more separate devices 300 within mobile network 110.

Device 300 may include a bus 310, a processing unit 320, a memory 330, an input device 340, an output device 350, and a communication interface 360. Bus 310 may include a path that permits communication among the components of device 300. Processing unit 320 may include one or more processors or microprocessors which may interpret and execute instructions, or processing logic. Memory 330 may include one or more memory devices for storing data and instructions. Memory 330 may include a random access memory (RAM) or another type of dynamic storage device that may store information and instructions for execution by processing unit 320, a Read Only Memory (ROM) device or another type of static storage device that may store static information and instructions for use by processing unit 320, and/or a magnetic, optical, or flash memory recording and storage medium. The memory devices of memory 330 may each be referred to herein as a "tangible non-transitory computer-readable medium," "non-transitory computer-readable medium," or "non-transitory storage medium." In some implementations, the processes/methods (or portions of the processes/methods) set forth herein can be implemented as instructions that are stored in memory 330 for execution by processing unit 320.

Input device 340 may include one or more mechanisms that permit an operator to input information into device 300, such as, for example, a keypad or a keyboard, a display with a touch sensitive panel, voice recognition and/or biometric mechanisms, etc. Output device 350 may include one or more mechanisms that output information to the operator, including a display, a speaker, etc. Input device 340 and output device 350 may, in some implementations, be implemented as a user interface (UI) that displays UI information and which receives user input via the UI. Communication interface 360 may include a transceiver(s) that enables device 300 to communicate with other devices and/or systems. For example, communication interface 360 may include one or more wired and/or wireless transceivers for communicating via mobile networks 110 or 120, and/or data network 115. In the case of RUs of RAN 150, communication interface 360 may further include one or more antenna arrays for generating radio frequency (RF) cells or cell sectors.

The configuration of components of network device 300 illustrated in FIG. 3 is for illustrative purposes. Other configurations may be implemented. Therefore, network device 300 may include additional, fewer and/or different components, that may be arranged in a different configuration, than depicted in FIG. 3.

Figure 4A:
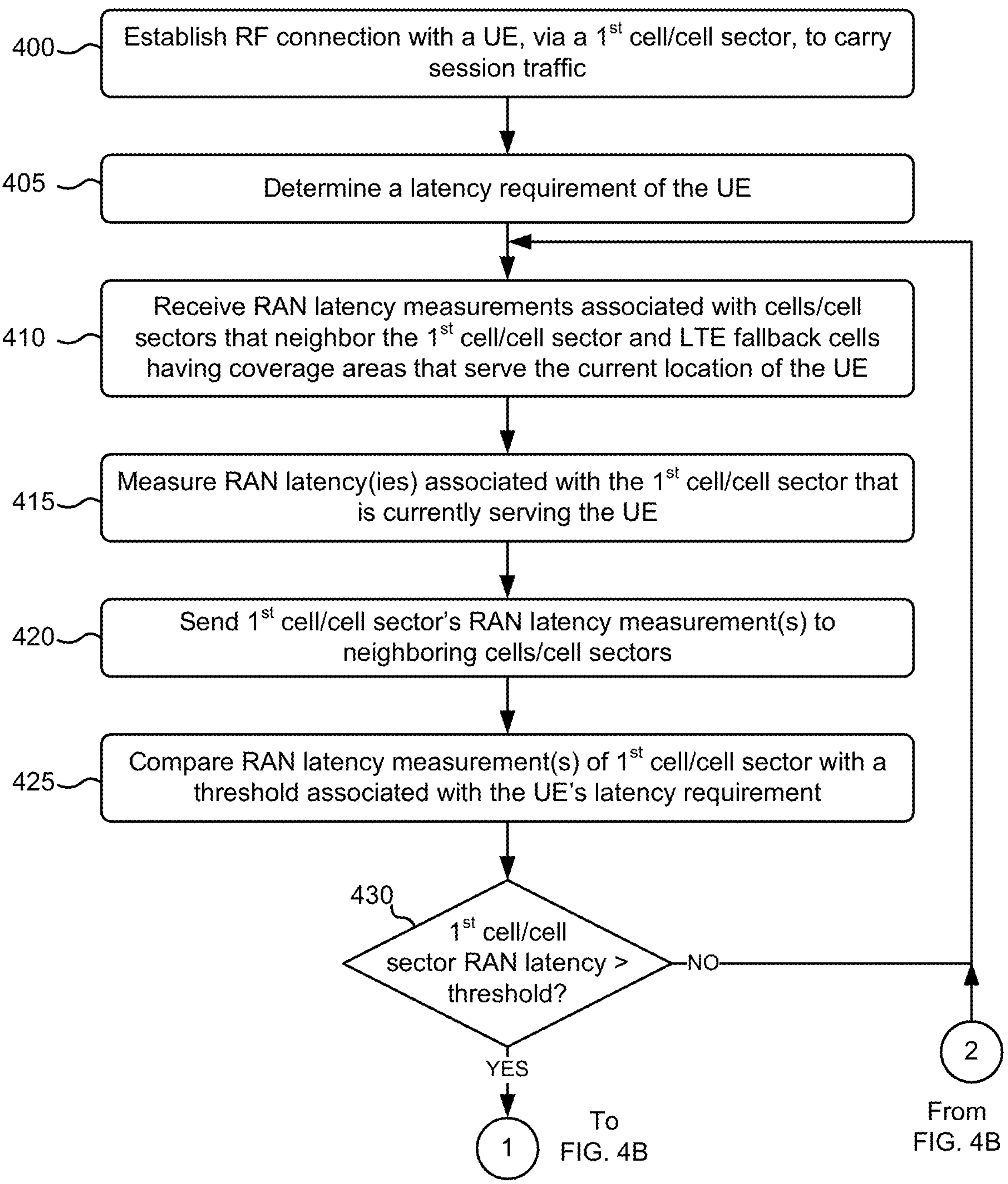
FIGS. 4A and 4B are flow diagrams of an example process for triggering a mobility event for a UE based on Radio Access Network (RAN) latency measurements.
Figure 4B:
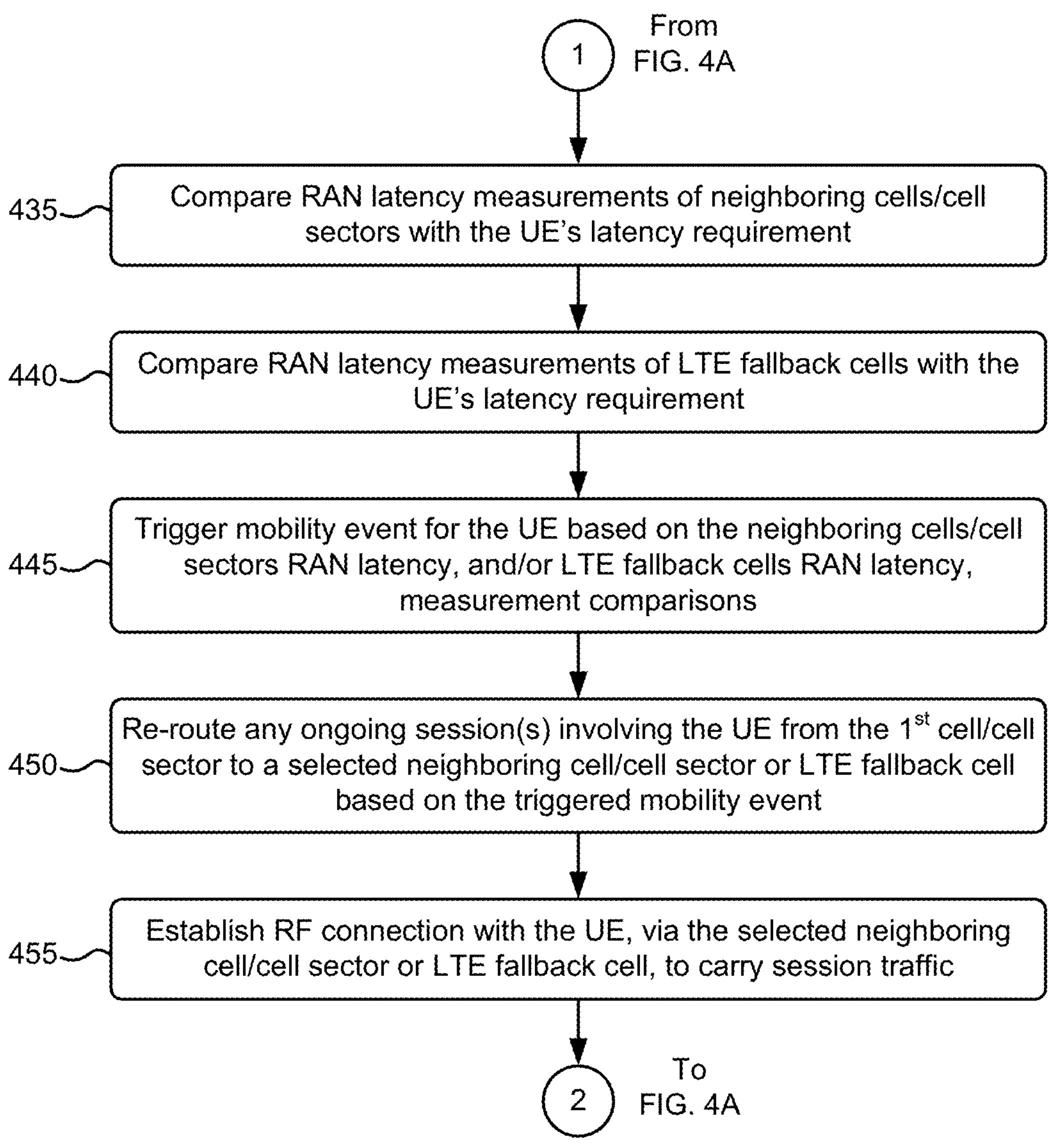

FIGS. 4A and 4B are flow diagrams of an example process for triggering a mobility event for a UE 105 based on RAN latency measurements associated with packet delivery to the UE 105, or to possibly other UEs 105, from a RAN network 150, 160, or 115 of a mobile network 110 or 120. The example process of FIGS. 4A and 4B may be implemented by a base station (e.g., a gNB of a Next Generation RAN 150 or 115 or an eNB of LTE RAN 160) in cooperation with other base stations of mobile network environment 100. The process of FIGS. 4A and 4B may be executed by a base station continuously, or periodically, upon establishment of an RF connection between the base station and a particular UE 105 for engaging in one or more traffic sessions. The example process of FIGS. 4A and 4B is described below with additional reference to FIGS. 5 and 6. "RAN latency," as referred to herein, is a measurement of delay in packet delivery from the gNB/eNB to one or more UEs 105 (i.e., downlink RAN latency), and/or from the one or more UEs 105 to the gNB/eNB (i.e., uplink RAN latency), within a particular cell and/or a particular RB. "RAN latency," as referred to herein, may therefore include a downlink RAN latency, an uplink RAN latency, or both downlink and uplink RAN latencies.

The example process includes a first base station establishing an RF connection with a UE 105, via a first cell or cell sector of the base station, to carry session traffic (block 400), and determining a latency requirement of the UE 105 (block 405). The first base station may be a gNB of Next Generation RAN 150 of SA Next Generation mobile network 110, a gNB of NSA Next Generation RAN 115, or an eNB of LTE AN 160 of 4G mobile network 120 having the UE 105 within the coverage area of the first cell or cell sector. The first base station may, via an array of RF antennas, generate multiple cells or cell sectors (including the first cell/cell sector), each having a particular geographic coverage area, that enables the UE 105, when traveling within those cells/cell sectors, to send and receive data via RF transmission/reception.

The RF connection may be established using existing mobile network procedures and using, for example, a RAN resource block (RB) assigned to the UE 105. If the traffic of UE 105 is to be carried via a particular network slice, then the RAN RB assigned to the UE 105 would be the RAN RB(s) assigned or allocated to the network slice. The base station may locally store the latency requirements (e.g., maximum downlink and/or uplink latency) of each UE 105 served by the base station, or may locally store the latency requirements for each network slice implemented at the base station. Alternatively, base station may obtain the UE or network slice latency requirement from another device/node in the mobile network 110 or 120.

The first base station receives RAN latency measurements associated with cells/cell sectors that neighbor the 1$^{st}$ cell/cell sector and LTE fallback cells having coverage areas that serve the current location of the UE 105 (block 410). A "LTE fallback cell," as referred to herein, is a cell/cell sector generated by an eNB of LTE RAN 160 that has an RF coverage area that overlaps the coverage area of a different cell/cell sector that is currently serving the UE 105. A "LTE fallback cell" often has a larger coverage area, and may substantially encompass, a neighboring Next Generation cell/cell sector (e.g., a 5G cell/cell sector) generated by a gNB of Next Generation RAN 105.

Figure 5:
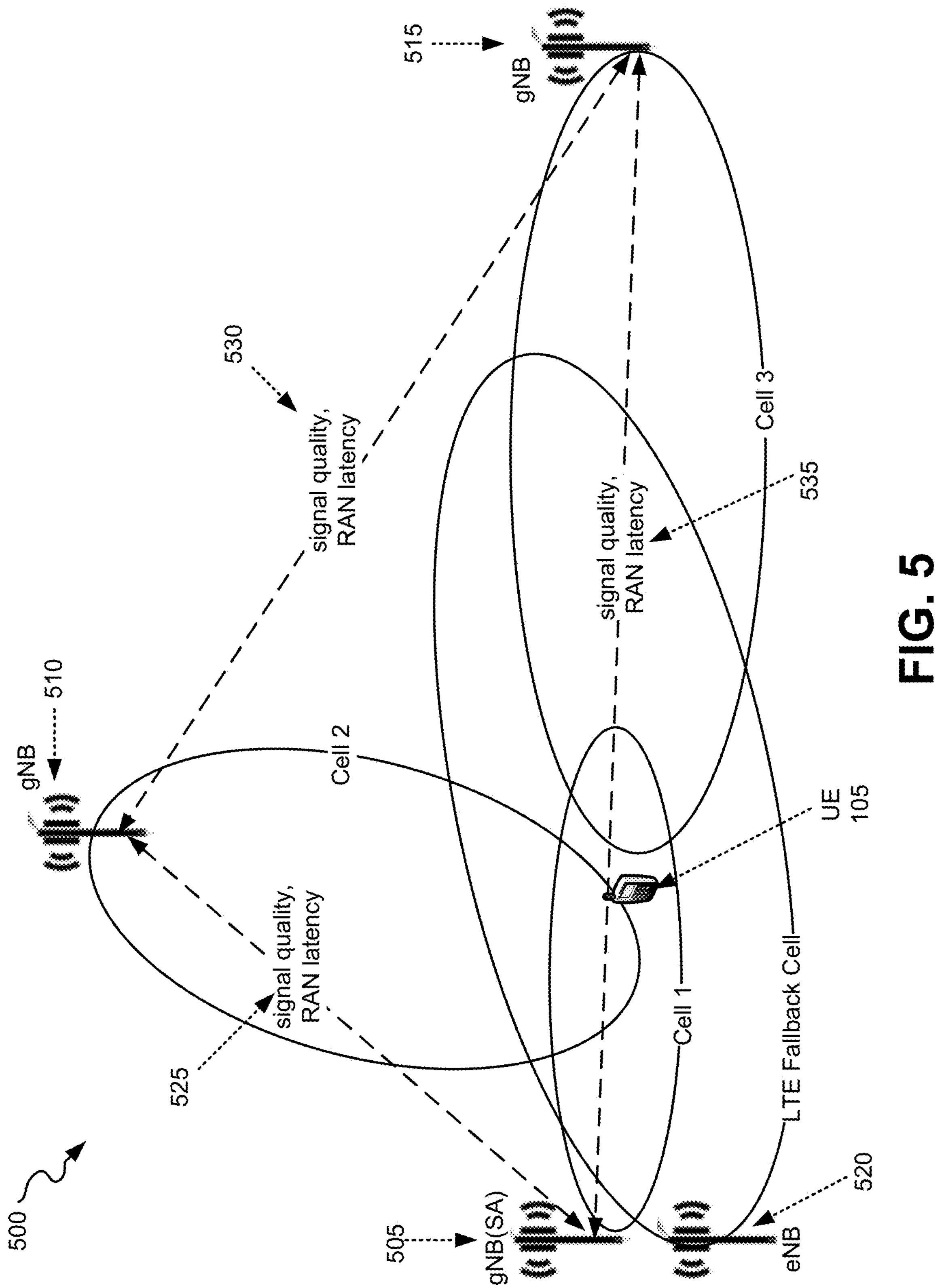
FIG. 5 illustrates an example of neighboring base stations exchanging cell/cell sector signal quality and RAN latency measurements.

In the cell coverage example 500 shown in FIG. 5, a gNB 505 and another gNB 510 exchange cell/cell sector signal quality and cell latency measurements. For example, gNB 505, gNB 510, gNB 515, and eNB 520 may obtain signal quality measurements for the cells/cell sectors that it generates, and may monitor a downlink and/or uplink RAN latency involving delays in packet delivery from the respective gNB or eNB to a destination UE 105 and/or to other UEs 105, or from a source UE 105 and/or other source UEs 105 to the respective gNB or eNB. Each base station may, for example, monitor RAN latency on a per physical Resource Block basis, or a per sub-carrier/TTI combination basis, such that each RB or each sub-carrier/TTI combination at each base station in the RAN which carries traffic to and/from a UE 105 has the delay in packet delivery from the base station to the UEs 105 (i.e., downlink RAN latency), and/or delay in packet delivery from the UEs 105 to the base station (i.e., uplink RAN latency), continuously, or periodically, monitored.

Each base station may then exchange signal quality and RAN latency data for its own cells/cell sectors with neighboring base stations. In the example of FIG. 5, gNBs 505 and 510 exchange signal quality and RAN latency measurement data 525 between one another, gNBs 510 and 515 exchange signal quality and RAN latency measurement data 530 between one another, and gNB 505 and gNB 515 exchange signal quality and RAN latency measurement data 535 between one another. eNB 520, which generates one or more fallback LTE cells in proximity to gNB 505, may also exchange signal quality and RAN latency measurement data (not shown in FIG. 5) with gNBs 505, 510, and/or 515. In the example shown in FIG. 5, a UE 105, currently served by cell 1 of gNB 505 has moved into a region of cell 1 that has overlapping coverage with cell 2 of gNB 510 and cell 3 of gNB 515. As shown, a larger fallback LTE cell, generated by eNB 520, also substantially overlaps the coverage area of cell 1 of gNB 505.

The first base station measures a RAN latency(ies) associated with the 1$^{st}$ cell/cell sector that is currently serving the UE 105 (block 415), and sends the 1$^{st}$ cell/cell sector's RAN latency measurement(s) to the neighboring cells/cell sectors (block 420). As already described with respect to block 410 above, the first base station may monitor downlink RAN latency (e.g., on a per physical Resource Block basis, or a per sub-carrier/TTI combination basis) such that each RB or sub-carrier/TTI combination at the first base station, which carries traffic to a UE 105, has the delay in packet delivery from the first base station to the UE 105 continuously, or periodically, monitored. Additionally, or alternatively, the first base station may monitor uplink RAN latency such that each RB, or sub-carrier/TTI combination, at the first base station, which carries traffic from a UE 105 to the first base station, has the delay in packet delivery from UE 105 to the first base station continuously, or periodically, monitored. The first base station then sends the RAN latency measurements (e.g., downlink RAN latency and/or uplink RAN latency) for each cell/cell sector generated by the first base station to every neighboring base station that is within a certain proximity to the first base station.

The first base station compares the RAN latency measurement(s) of the 1$^{st}$ cell/cell sector with a threshold(s) associated with the UE 105's latency requirement(s) (block 425). The threshold may be a certain percentage (e.g., about 80%) of the maximum latency requirement associated with the UE 105. The UE 105's latency requirements may include a downlink RAN latency requirement, an uplink RAN latency requirement, or a downlink RAN latency requirement and an uplink RAN latency requirement, with the downlink RAN latency requirement being either the same, or different, than the uplink RAN latency requirement. For example, if a UE 105 has a maximum downlink RAN latency requirement of 200 milliseconds (ms), then a downlink threshold may be set at 160 ms. As a further example, if the UE 105 has a maximum uplink RAN latency requirement of 250 ms, then the uplink threshold may be set at 200 ms. Therefore, a different threshold may be set for each of the downlink RAN latency and the uplink RAN latency, or a same threshold may be set for both the downlink RAN latency and the uplink RAN latency. The maximum latency requirement for a given UE 105 may be derived from the network slice to which the UE 105 is assigned, or may be derived from a subscriber profile associated with the subscriber that owns and/or operates the UE 105. As another example, the threshold(s) may be set exactly to the UE 105's downlink and/or uplink RAN latency requirement. For example, if a network slice to which a UE 105 is assigned has a maximum downlink RAN latency requirement of 300 ms, then the downlink threshold may be set to 300 ms. As a further example, if a network slice to which the UE 105 is assigned has a maximum uplink RAN latency requirement of 400 ms, then the uplink threshold may be set to 400 ms.

If the 1$^{st}$ cell/cell sector RAN latency measurement(s) is not greater than a threshold value(s) (NO—block 430), then the process returns to block 410 with the receipt of updated RAN latency measurements from neighboring cells/cell sectors and/or LTE fallback cells. If the 1$^{st}$ cell/cell sector RAN latency measurement(s) is greater than the threshold value(s) (YES—block 430), then the first base station compares the RAN latency measurements of the neighboring cells/cell sectors with the UE 105's latency requirement(s) (block 435 of FIG. 4B), and compares the RAN latency measurement of the LTE fallback cells with the UE 105's latency requirement(s) (block 440). Referring to the example of FIG. 5, the downlink RAN latency measurements of the cells/cell sectors and LTE fallback cells that neighbor gNB 505, may be about: 100 ms, 150 ms, and 50 ms for cell 2, cell 3, and the LTE fallback cell of FIG. 5. Assuming that the UE 105 is associated with a maximum downlink latency requirement of 125 ms, then cell 2 of gNB 510, having a downlink RAN latency of about 100 ms, and the LTE fallback cell of eNB 520, having a downlink RAN latency of about 50 ms would both be less than the maximum latency requirement of 125 ms for UE 105 and, therefore, cell 2 of gNB 510 and LTE fallback cell of eNB 520 would be candidates for a hand-off of service from cell 1 of gNB 505.

The first base station triggers a mobility event for the UE 105 based on the neighboring cells/cell sectors RAN latency, and/or LTE fallback cells RAN latency, measurement comparisons (block 445), and re-routes any ongoing session(s) involving the UE from the 1$^{st}$ cell/cell sector to a selected neighboring cell/cell sector or LTE fallback cell based on the triggered mobility event (block 450). The first base station, based on the comparisons performed in blocks 435 and 440, may select one cell/cell sector from a set of cells/cell sectors, that includes all of the neighboring cells/cell sectors and any LTE fallback cells having overlapping cell coverage with a current location of the UE 105. For example, referring to the example of FIG. 5, if at a current location of UE 105 within cell 1, the downlink and/or uplink RAN latency of cell 1 climbs higher than the maximum latency requirement(s) of a network slice that is currently serving the UE 105, and the LTE fallback cell has a current measured downlink and uplink RAN latency that is less than the maximum latency requirement(s), then gNB 505 may initiate fallback of mobile service by gNB 505 of Next Generation mobile network 110 to eNB 520 of 4G mobile network 120. The first base station re-routes any ongoing session(s) involving the UE to a selected neighboring cell/cell sector or LTE fallback cell using existing hand-off or LTE fallback procedures.

Alternatively, the mobility event triggered by the monitored RAN latencies may be from one RB (e.g., subcarrier(s) and TTI) in the RAN to another RB in the RAN. The first RB and the second RB may involve two different neighboring base stations, or a single base station that generates two or more overlapping cells/cell sectors. As an additional alternative, the mobility event triggered by the monitored RAN latencies may be between different subcarrier/TTI combinations within a same RB assuming that a given RB includes multiple sub-carrier/TTI combinations.

Figure 6:
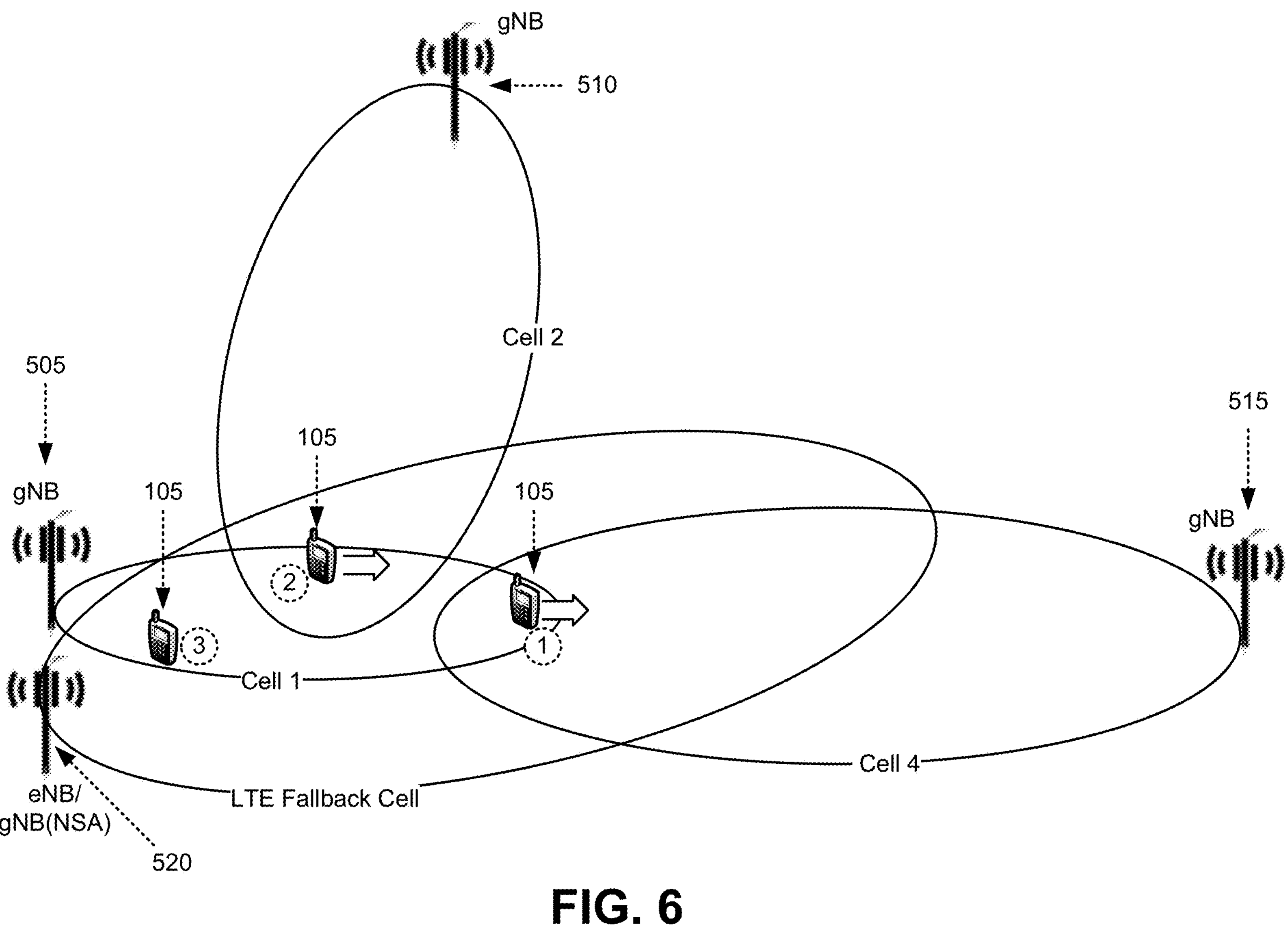
FIG. 6 depicts examples of possible circumstances when a mobility event for a UE may be initiated based on RAN latency measurements.

FIG. 6 depicts a number of further examples of possible circumstances when a mobility event for a UE 105 may be initiated based on RAN latency measurements, and not solely based on signal quality measurements of neighboring cells. In a first circumstance (identified with a "1" within a circle) UE 105 may be moving out to an edge of cell 1 of gNB 505 where the signal quality and downlink RAN latency associated with cell 1 is degrading so as to fall below minimum or maximum threshold requirements for service to the UE 105. In this situation, UE 105 may either fallback to LTE fallback cell of eNB 520 that has overlapping coverage of cell 1, or may be handed off to cell 4 of gNB 515 that has cell coverage that extends into the coverage area of cell 1, to obtain, for example, an improvement in downlink RAN latency for the UE 105's traffic.

In a second circumstance (identified with a "2" within a circle), UE 105 may be traveling in a direction at a location within cell 1 of gNB 505 that is an "interfered area" in which topography (e.g., hills or mountains) or man-made features (e.g., high-rise buildings) are detrimentally impacting latency as well as Internet connectivity. In this situation, UE 105 may either fallback to LTE fallback cell of eNB 520 that has overlapping coverage of cell 1, or may be handed off to 2 of gNB 510 that has cell coverage that extends into the coverage area of cell 1, to obtain an improvement in downlink and/or uplink RAN latency for the UE 105's traffic.

In a third circumstance (identified with a "3" within a circle), UE 105 may be located at a particular location within cell 1 of gNB 505 that currently has a good RF environment but at a particular time when cell 1 is congested, thereby negatively affecting traffic latency. In this situation, UE 105 may fallback to LTE fallback cell of eNB 520, that has overlapping coverage of cell 1, to obtain improved traffic performance, including a reduced downlink and/or uplink RAN latency.

A second base station associated with the selected neighboring cell/cell sector or LTE fallback cell may establish an RF connection with the UE 105, via the neighboring cell/cell sector or LTE fallback cell, to carry session traffic (block 455). During re-routing of a traffic session from the first base station to the second base station associated with the selected neighboring cell/cell sector or LTE fallback cell, the UE 105 and second base station engage in RF connection establishment using existing mobile network procedures (e.g., a RRC Connection Establishment procedure). Subsequent to RF connection establishment, the second base station begins sending any re-routed traffic sessions on the downlink, and receiving traffic session data on the uplink, between the second base station and the UE 105. After completion of block 455, the second base station, and neighboring cell/cell sector or LTE fallback cell to which the session for the UE 105 has been handed off becomes the "first base station" and "1st cell/cell sector" for purposes of repeating blocks 410-455 of the example process of FIGS. 4A and 4B.

The blocks of FIGS. 4A and 4B may be repeated each time a UE 105 newly establishes a RF connection with a base station (e.g., gNB) after powering on within the wireless coverage area of the base station within network environment 100. After an initial RF connection establishment between the UE 105 and a first base station, blocks 410-455 of FIGS. 4A and 4B may be repeated continuously or periodically. The blocks of FIGS. 4A and 4B may be executed in parallel for each UE 105 of numerous UEs 105 connected to SA Next Generation RAN 150 of mobile network 110, to NSA Next Generation RAN 115, or to LTE RAN 160 of 4G mobile network 120.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks has been described with respect to FIGS. 4A and 4B, the order of the blocks may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processing unit 320) of a device. A non-transitory storage medium includes one or more of the storage mediums described in relation to memory 330. The non-transitory computer-readable storage medium may be implemented in a centralized, distributed, or logical division that may include a single physical memory device or multiple physical memory devices spread across one or multiple network devices.

To the extent the aforementioned embodiments collect, store or employ personal information of individuals, such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

All structural and functional equivalents to the elements of the various aspects set forth in this disclosure that are known or later come to be known to those of ordinary skill in the art are expressly incorporated herein by reference and are intended to be encompassed by the claims.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

determining, by a base station, a latency requirement of a user equipment device (UE);

receiving, by the base station, latency measurements associated with multiple neighboring cells or cell sectors having coverage areas within a certain proximity to the base station, wherein each of the received latency measurements comprises a delay in packet delivery between a respective base station associated with each one of the multiple neighboring cells or cell sectors and at least one UE traversing the one of the multiple neighboring cells or cell sectors;

measuring, by the base station, a latency associated with a first cell or cell sector, having a coverage area generated by the base station, that is currently serving the UE; and triggering, by the base station, a mobility event for the UE, based on the UE's latency requirement, the measured latency of the first cell or cell sector, and the received latency measurements, to a selected one of the multiple neighboring cells or cell sectors.

2. The method of claim 1, wherein the latency associated with the first cell or cell sector comprises a delay in packet delivery between the base station and the UE.

3. The method of claim 1, wherein the latency requirement comprises a maximum latency required by a network slice to which the UE has been assigned or to which the UE has subscribed.

4. The method of claim 1, further comprising:

comparing the measured latency associated with the first cell or cell sector with a threshold associated with the latency requirement, wherein the mobility event for the UE is further triggered based on the comparison of the measured latency with the first cell or cell sector with the threshold.

5. The method of claim 4, further comprising:

determining a maximum latency threshold based on the latency requirement, wherein comparing the measured latency associated with the first cell or cell sector with the threshold comprises: comparing the measured latency associated with the first cell or cell sector with the maximum latency threshold to determine whether the measured latency exceeds the maximum latency threshold, and wherein the mobility event for the UE is further triggered when the measured latency associated with the first cell or cell sector is determined to exceed the maximum latency threshold.

6. The method of claim 1, further comprising:

comparing the latency measurements associated with multiple neighboring cells or cell sectors with the latency requirement, wherein the mobility event for the UE is further triggered based on the comparison of the latency measurements associated with the multiple neighboring cells or cell sectors with the latency requirement.

7. The method of claim 1, wherein the delay in packet delivery comprises at least one of uplink delay or downlink delay.

8. A base station, comprising:

at least one communication interface configured to receive latency measurements associated with multiple neighboring cells or cell sectors having coverage areas within a certain proximity to the base station, wherein each of the received latency measurements comprises a delay in packet delivery between a respective base station associated with each one of the multiple neighboring cells or cell sectors and at least one UE traversing the one of the multiple neighboring cells or cell sectors, and at least one processor configured to:

determine a latency requirement of a user equipment device (UE) that is currently served by the base station, measure a latency associated with a first cell or cell sector, and trigger a mobility event for the UE, based on the UE's latency requirement, the measured latency of the first cell or cell sector, and the received latency measurements, to a selected one of the multiple neighboring cells or cell sectors.

9. The base station of claim 8, wherein the latency associated with the first cell or cell sector comprises a delay in packet delivery between from the base station and to the UE.

10. The base station of claim 8, wherein the latency requirement comprises a maximum latency required by a network slice to which the UE has been assigned or to which the UE has subscribed.

11. The base station of claim 8, wherein the at least one processor is configured to:

compare the measured latency associated with the first cell or cell sector with a threshold associated with the latency requirement, wherein the mobility event for the UE is further triggered based on the comparison of the measured latency with the first cell or cell sector with the threshold.

12. The base station of claim 11, wherein the at least one processor is configured to:

determine a maximum latency threshold based on the latency requirement, wherein, when comparing the measured latency associated with the first cell or cell sector with the threshold, the at least one processor is further configured to: compare the measured latency associated with the first cell or cell sector with the maximum latency threshold to determine whether the measured latency exceeds the maximum latency threshold, and wherein the mobility event for the UE is further triggered when the measured latency associated with the first cell or cell sector is determined to exceed the maximum latency threshold.

13. The base station of claim 8, wherein the at least one processor is configured to:

compare the latency measurements associated with multiple neighboring cells or cell sectors with the latency requirement, wherein the mobility event for the UE is further triggered based on the comparison of the latency measurements associated with the multiple neighboring cells or cell sectors with the latency requirement.

14. The base station of claim 8, wherein the delay in packet delivery comprises at least one of uplink delay or downlink delay.

15. A non-transitory storage medium storing instructions executable by a base station, wherein execution of the instructions causes the base station to:

determine a latency requirement of a user equipment device (UE);

receive latency measurements associated with multiple neighboring cells or cell sectors having coverage areas within a certain proximity to the base station, wherein each of the received latency measurements comprises a delay in packet delivery between a respective base station associated with each one of the multiple neighboring cells or cell sectors and at least one UE traversing the one of the multiple neighboring cells or cell sectors;

measure a latency associated with a first cell or cell sector, having a coverage area generated by the base station, that is currently serving the UE; and trigger a mobility event for the UE, based on the UE's latency requirement, the measured latency of the first cell or cell sector, and the received latency measurements, to a selected one of the multiple neighboring cells or cell sectors.

16. The non-transitory storage medium of claim 15, wherein the latency associated with the first cell or cell sector comprises a delay in packet delivery between the base station and the UE.

17. The non-transitory storage medium of claim 15, wherein the latency requirement comprises a maximum latency required by a network slice to which the UE has been assigned or to which the UE has subscribed.

18. The non-transitory storage medium of claim 15, wherein execution of the instructions causes the base station to:

compare the measured latency associated with the first cell or cell sector with a threshold associated with the latency requirement, wherein the mobility event for the UE is further triggered based on the comparison of the measured latency with the first cell or cell sector with the threshold.

19. The non-transitory storage medium of claim 18, wherein execution of the instructions causes the base station to:

determine a maximum latency threshold based on the latency requirement, wherein, when comparing the measured latency associated with the first cell or cell sector with the threshold, execution of the instructions further causes the base station to:

compare the measured latency associated with the first cell or cell sector with the maximum latency threshold to determine whether the measured latency exceeds the maximum latency threshold, and wherein the mobility event for the UE is further triggered when the measured latency associated with the first cell or cell sector is determined to exceed the maximum latency threshold.

20. The non-transitory storage medium of claim 15, wherein execution of the instructions causes the base station to:

compare the latency measurements associated with multiple neighboring cells or cell sectors with the latency requirement, wherein the mobility event for the UE is further triggered based on the comparison of the latency measurements associated with the multiple neighboring cells or cell sectors with the latency requirement.

* * * * *